US011637754B2

(12) United States Patent
Pandey et al.

(10) Patent No.: US 11,637,754 B2
(45) Date of Patent: Apr. 25, 2023

(54) ROADSIDE INFRASTRUCTURE DEPLOYMENT

(71) Applicant: Ford Global Technologies, LLC, Dearborn, MI (US)

(72) Inventors: Gaurav Pandey, College Station, TX (US); Jeffrey Thomas Remillard, Ypsilanti, MI (US); Mostafa Parchami, Ann Arbor, MI (US); Helen E. Kourous-Harrigan, Monroe, MI (US); John Anthony Lockwood, Howell, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 17/150,292

(22) Filed: Jan. 15, 2021

(65) Prior Publication Data

US 2022/0231919 A1 Jul. 21, 2022

(51) Int. Cl.
*H04L 12/24* (2006.01)
*H04W 84/18* (2009.01)
*H04W 4/021* (2018.01)
*H04W 4/38* (2018.01)
*H04W 4/40* (2018.01)
(Continued)

(52) U.S. Cl.
CPC .............. *H04L 41/12* (2013.01); *B60W 40/10* (2013.01); *H04L 41/145* (2013.01); *H04W 4/021* (2013.01); *H04W 4/38* (2018.02); *H04W 4/40* (2018.02); *H04W 84/18* (2013.01)

(58) Field of Classification Search
CPC ...... B60W 40/10; H04L 41/12; H04L 41/145; H04L 41/16; H04L 43/08; H04W 4/021; H04W 4/40; H04W 84/18; H04W 4/38
See application file for complete search history.

(56) References Cited

U.S. PATENT DOCUMENTS 10,819,618 B1 * 10/2020 Wada ...................... H04L 41/12
2017/0331687 A1 * 11/2017 Crickett .............. H04L 41/0816
(Continued)

FOREIGN PATENT DOCUMENTS

CN 110422177 A 11/2019
WO 2019053524 A1 3/2019

OTHER PUBLICATIONS

Mohammed et al., "Fog Computing-Based Model for Mitigation of Traffic Congestion", DOI 10.5013/IJSSST.a.19.03.05, ISSN: 1473-804x online, 1473-8031 print.

*Primary Examiner* — Awet Haile
(74) *Attorney, Agent, or Firm* — Frank A. MacKenzie; Bejin Bieneman PLC

(57) ABSTRACT

A set of first candidate topologies of first candidate roadside infrastructure nodes at respective mounting locations in a geographic area is randomly generated. For each of the first candidate topologies, first simulations, including detection of objects according to selected sensor parameters, installation parameters, and environment parameters for the candidate nodes at the respective mounting locations, are executed. First fitness scores are determined for each of the first candidate topologies by comparing results of the first simulations to ground truth data. Upon identifying one of the first fitness scores as exceeding a threshold, the candidate topology associated with the identified first fitness score is identified for deployment.

18 Claims, 8 Drawing Sheets

(51) Int. Cl.
    *H04L 41/12*     (2022.01)
    *H04L 41/14*     (2022.01)
    *B60W 40/10*     (2012.01)

(56) References Cited

U.S. PATENT DOCUMENTS

| | | | |
|---|---|---|---|
| 2017/0346691 A1* | 11/2017 | Crickett | H04L 41/0823 |
| 2019/0045378 A1* | 2/2019 | Rosales | H04L 67/34 |
| 2019/0132709 A1* | 5/2019 | Graefe | G08G 1/096716 |
| 2020/0257310 A1 | 8/2020 | Du et al. | |
| 2021/0272304 A1* | 9/2021 | Yang | G06T 7/536 |
| 2022/0204009 A1* | 6/2022 | Choi | B60W 50/06 |

* cited by examiner

ROADSIDE INFRASTRUCTURE DEPLOYMENT

BACKGROUND

A roadside infrastructure system can include a cluster or group of roadside infrastructure nodes in an area, e.g., situated proximate to an intersection of roads. An infrastructure node can include one or more sensors, e.g., visible light cameras, infrared cameras, radar, lidar, etc., to provide data about the area. Infrastructure sensors can provide data, e.g., that can be provided to vehicles, specifying a location or locations of stationary and/or moving objects in the area, e.g., with respect to roads, buildings, bridges, crosswalks, intersections, vehicles, and/or other objects.

DETAILED DESCRIPTION

Overview

Figure 1:
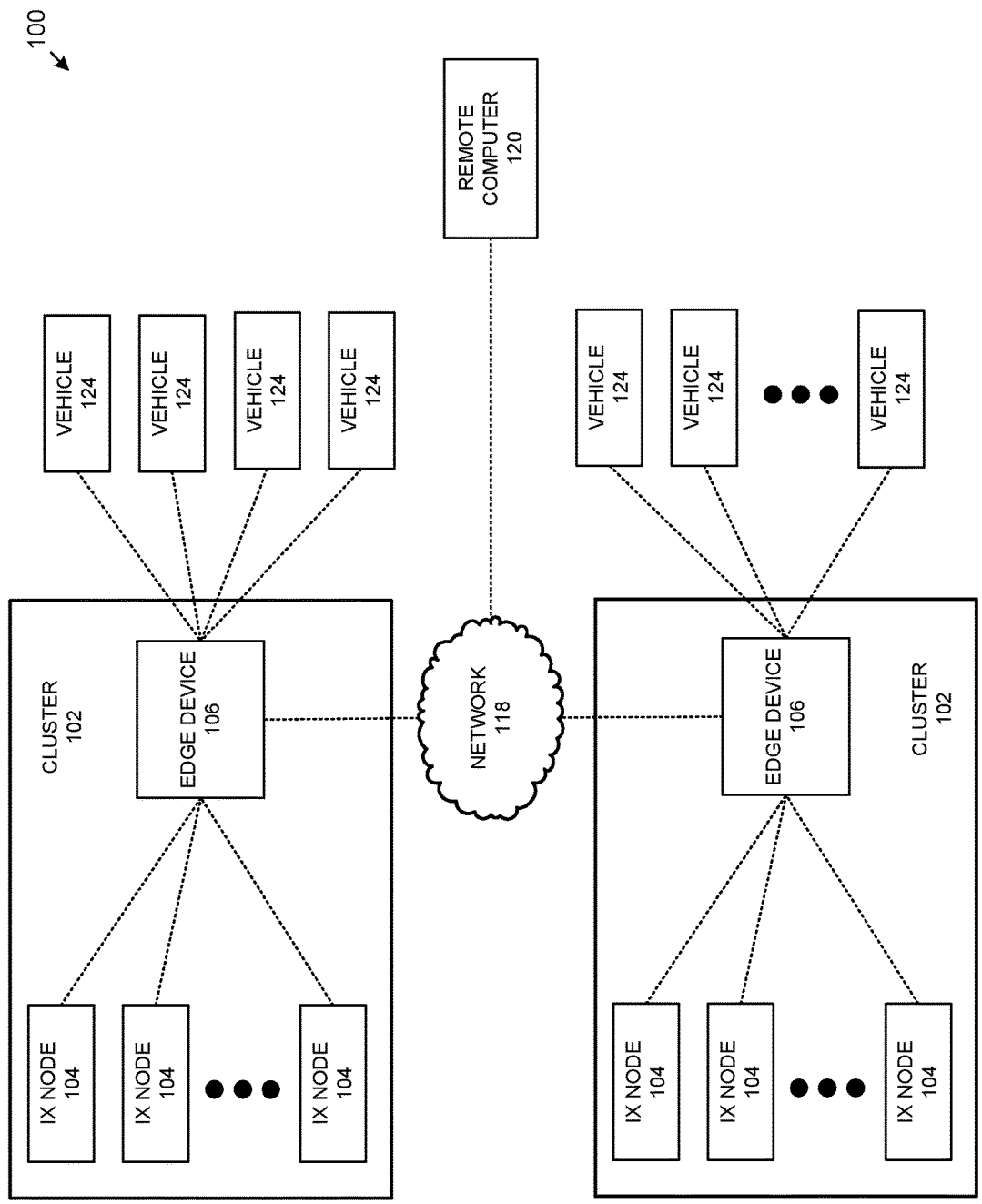
FIG. 1 is a block diagram of an example roadside infrastructure system.

Now referring to FIGS. 1-4, an example roadside infrastructure system 100 includes one or more infrastructure node clusters 102, which in turn include one or more infrastructure nodes 104. Sensors 108 disposed in or on nodes 104 can provide data about an environment proximate to nodes 104 in a cluster 102, e.g., data can be provided to and/or about one or more vehicles 124 in an area 400 in which nodes 104 are installed at mounting locations 405 (see FIG. 4). Typically, each of the infrastructure nodes 104 in a cluster 102 is in communication with at least one other infrastructure node 104 and/or an edge device (or edge node) 106. Communications between infrastructure nodes 104 and/or the edge device 106 in an infrastructure node cluster 102 can occur over various media, e.g., wireless communications media such as the radio frequency spectrum or wired communications media such as a cable, according to various protocols such as Ethernet, Wi-Fi®, Bluetooth®, etc. An arrangement or configuration of infrastructure nodes 104 and the edge device 106 in an infrastructure node cluster 102, i.e., a specification of mounting locations 405, and communications media between nodes 104, 106, can be specified according to what may be referred to as a cluster topology, as explained further below. Disclosed herein are techniques for determining efficient topologies or elements in a cluster 102, including nodes 104 and an edge device 106, and more generally for determining a cluster configuration (explained further below) that includes a node topology.

According to a specified topology, the infrastructure nodes 104 in a cluster 102 may be disposed about a geographic area such as an intersection of roads, and may have various sensors 108 mounted thereto to provide data about objects, such as vehicles, pedestrians, etc., in the area. An infrastructure node 104 can include a computing device 110 to process data from sensors 108, and the communication interface 112, to send and receive data to and/or from other nodes 104 and/or an edge device 106, e.g., according to wired and/or wireless networking protocols. Further, data such as information about objects in an area can be communicated from an infrastructure node cluster 102, e.g., by the edge device 106, to one or more devices in the area such as vehicles 114. The edge device 106 can also communicate via a wide area network 118, e.g., with a remote computer 120.

In this context, a cluster 102 topology includes a specification of how nodes 104 in a cluster 102 are positioned, and how the nodes 104 and edge device 106 communicate with one another. A cluster node configuration (simply cluster configuration) includes the cluster 102 topology, and also, for each node 104, 106 in the cluster 102, a specification of one or more sensors 108 included in or on the node 104,106 and a position of the sensor(s) 108. A cluster 102 topology includes what is known as a network topology, i.e., a specification for each node 104 in a cluster 102 of the one or more other nodes 104 and/or edge device 106 with which the node 104 can communicate, as well as a communications medium or media (e.g., one or more of wired, wireless, coaxial cable, fiber-optic cable, ethernet, Wi-Fi®, Bluetooth®, etc.). Specifying how each node 104 and the edge device 106 are positioned means specifying the physical location (e.g., according to a coordinate system for an area in which a cluster 102 is deployed and/or a global coordinate system) including a fixed reference frame for the cluster 102, e.g., for nodes 104 and/or edge device 106, with respect to which all sensors 108 are mounted and calibrated A position, in addition to a physical location of a node 104, 106, can also include its pose or orientation in six degrees of freedom. As stated above, a cluster 102 node configuration can include node 104, 106 poses or orientations as part of the cluster 102 topology, and can further include poses or orientations for sensor(s) included in respective nodes 104, 106.

Positioning nodes 104 and edge devices 106 can be an important part of cluster 102 topology because the topology should support not only communications between infrastructure nodes 104 and/or the edge device 106, but further needs to support such communications in a manner that timely and accurately communicates sensor 108 data from respective infrastructure nodes 104. Moreover, in addition to node 104 and edge device 106 locations, pose or orientation (i.e., defining X, Y, and Z axes for a node 104 and/or sensors 108 thereon, and determining angles of the node 104 X, Y, and Z axes with respect to X, Y, and Z axes of a three-dimensional (3D) and/or Cartesian coordinate system for an area) can be important to support positioning sensors 108 in a manner to obtain useful data about an area being monitored by nodes 104 in a node cluster 102.

It is technically challenging to implement and test a single cluster 102 topology, much less multiple or many possible topologies. A wide variety of factors can influence whether a topology is feasible or desirable. These factors can include possible mounting locations in an area for nodes 104, possible fields of view for sensors 108 at various mounting locations, types of network connection, e.g., wired or wireless, available for nodes 104 at various locations, possible latencies, package drops, and other network inefficiencies based on various node 104 or edge device 106 locations and/or network configuration, etc.

Advantageously, it is possible to implement a system and method that includes a genetic search algorithm to select a cluster 102 topology by evaluating candidate topologies as part of candidate cluster configurations. A candidate topology specifies install parameters (explained below) for nodes 104, 106 in a cluster 102, where install parameters for a node 104, 106 includes a location, as well as other characteristics of the node location, such as available power, available communications, and/or possible orientation and pose for sensor(s) 108 mounted at the location. The candidate topology can then be included with other parameters (e.g., sensor parameters and environmental parameters described further below) as part of a cluster node configuration that is input to a simulation; output from the simulation can then be used to evaluate the candidate topology. For example, it is possible to randomly generate a set of individual candidate cluster topologies for an infrastructure node cluster 102, and then, based on simulated scenarios (i.e., the scenarios are defined by cluster node configurations respectively including the candidate topologies) for each of the individual cluster topologies, evaluate each individual candidate cluster topology's fitness according to a fitness function. If any individual's fitness exceeds a threshold, that individual can be selected as a final cluster 102 topology for deployment. If not, some of the individual topologies can be selected for a next generation of the genetic algorithm based on evaluation according to the fitness function. In one example, a set of top individuals based on evaluation of the fitness function are selected and combined with a randomly generated set of as-yet untested individuals as a next generation of individual topologies to be evaluated. The fitness function can then be applied to this next generation of individual cluster topologies, i.e., further iterations can be performed until at least one individual cluster topology is evaluated by the fitness function to exceed the specified fitness threshold.

Roadside Infrastructure System

As mentioned above, and as seen in FIG. 1, a roadside infrastructure system 100 includes one or more infrastructure node clusters 102, wherein each of the infrastructure node clusters 102 typically includes a plurality of infrastructure nodes 104 that are in communication with an edge device 106. The infrastructure nodes 104 in an infrastructure node cluster 102 are typically arranged to monitor a specified geographic area, e.g., an area around a road intersection or the like defined by a geofence or the like specified by geo-coordinates such as conventional latitude, longitude pairs, to monitor an environment, including objects such as vehicles, cyclists, pedestrians, etc., in the area. The infrastructure nodes 104 can be in communication with each other and/or devices not included in the cluster 102, such as computers in vehicles 124 and/or a remote computer 120 via mechanisms such as Wi-Fi, Dedicated Short Range Communications (DSRC), Cellular V2X (CV2X), a wide area network 118, etc., e.g., via an edge device 106 that connects and/or coordinates nodes 104 in a cluster 102 with each other and possibly also with vehicles 124 and/or the remote computer 120.

Figure 2:
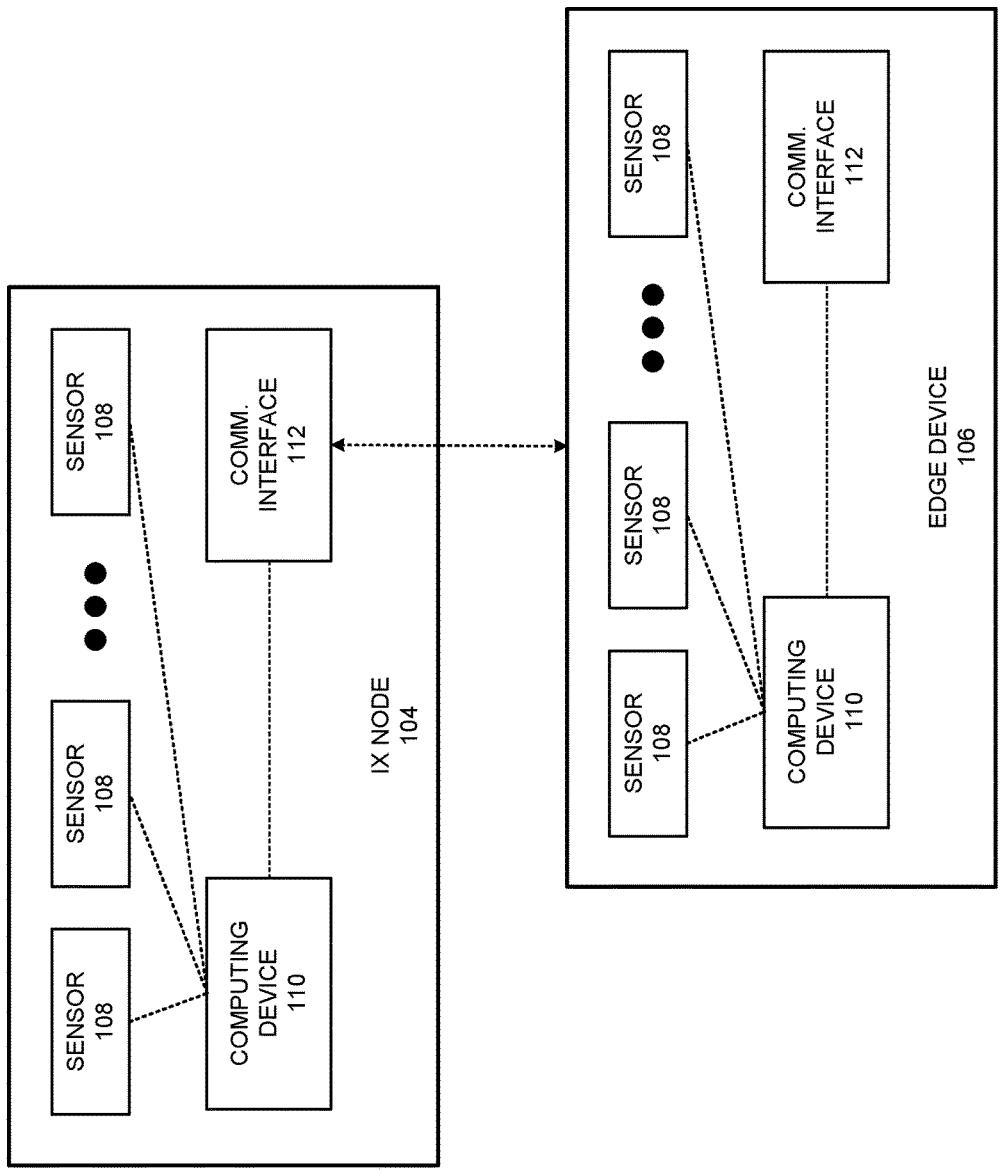
FIG. 2 is a block diagram of a roadside infrastructure node.

Referring now to FIG. 2 as well as FIG. 1, an infrastructure node 104 is typically stationary or non-moving, i.e., fixed to, and not able to move from, a specific physical location. Accordingly, an infrastructure node 104 is typically mounted to a physical structure such as a tower or other support structure (e.g., a pole, a box mountable to a bridge support, cell phone tower, road sign support, etc.), on or in which one or more node sensors 108 included in a node 104, as well as a node computing device 110 and node communications interface 112 can be housed, mounted, stored, and/or contained, and powered, etc. Via the node communications interface 112, the infrastructure node 104 can be in communication with an edge device 106 and/or one or more other nodes 104.

An edge device 106 includes a processor and a memory. A memory of a computer 110 included in an edge device 106 can store program instructions executable by the processor for carrying out various operations including as described herein. Typically, one or more edge devices 106 are provided for communication with devices outside of a cluster 102, such as vehicles 124 and/or a remote computer 120; nodes 104, in contrast, typically are configured only to communicate with an edge device 106. The edge device 106 can also include conventional communication elements (e.g., a communication interface 112), e.g., transceiver(s) for wireless communication via Wi-Fi®, Bluetooth®, DSRC, etc., or wired communications, e.g., for communications with infrastructure nodes 104, devices in an area of a node cluster 102, e.g., computers with communication interfaces in vehicle 124, etc. The edge device 106 can provide data from nodes 104 (i.e., typically sensor 108 data) possibly being aggregated or combined from a plurality of infrastructure nodes 104 in the infrastructure node cluster 102, to one or more vehicles 124 in the area. In another example, the edge device 106 could provide map data to vehicles, e.g., data about stationary objects in an area could be provided at a higher level of granularity that is typically available from maps provided to a vehicle 124 for navigation. Further, the edge device 106 could include (but does not necessarily include) one or more sensors 108 as described for infrastructure nodes 104. Yet further, in addition to receiving data from nodes 104 (e.g., sensor 108 data), an edge device 106 can receive data from vehicles 124 and other devices such as portable user computing devices (e.g., smartphones and the like). For example, vehicles 124 that have wireless communication capability could report their sensor data, locations, etc., as could a portable user device. Such data could be combined with data from node 104, 106 sensors 108.

A sensor 108 is a device that can obtain one or more measurements of one or more physical phenomena. Often, but not necessarily, a sensor 108 includes an analog-to-digital converter to convert sensed analog data to a digital signal that can be provided to a digital computer, e.g., via a network. Sensors 108 can include a variety of devices, and can be disposed to sense an environment, provide data about objects, etc., in a variety of ways. For example, a sensor 108 could be mounted to a stationary infrastructure element on, over, or near a road. Moreover, various controllers in a vehicle 124 may operate as sensors to provide data via the vehicle 124 network or bus, e.g., data relating to vehicle 124 speed, acceleration, location, subsystem and/or component status, etc. Further, other sensors, in or on a vehicle 124, infrastructure node 104, etc., could include cameras, short range radar, long range radar, LIDAR, and/or ultrasonic transducers, weight sensors, accelerometers, motion detectors, etc., i.e., sensors to provide a variety of data. To provide just a few non-limiting examples, sensor 108 data could include data for determining a position of a component, a location of an object, a speed of an object, a type of an object, a slope of a roadway, a temperature, a presence or amount of moisture, a fuel level, a data rate, etc.

A node computing device 110 can be programmed, e.g., according to software instructions and/or an arrangement of circuitry, to receive and process data from one or more node sensors 108. Further, the node computing device 110, via a node communication interface 112, can send and receive data to and from an edge device 106 via wired and/or wireless protocols. The node computing device 110 includes a processor and a memory, the memory storing instructions for the processor to carry out various operation, including as disclosed herein. The node computing device 110 could be a generic computer with a processor and memory and/or may include a dedicated electronic circuit including an ASIC (Application Specific Integrated Circuit) or the like that is manufactured for a particular operation, e.g., an ASIC for processing sensor 108 data and/or communicating the sensor 108 data. In another example, anode computing device 110 computer may include an FPGA (Field-Programmable Gate Array) which is an integrated circuit manufactured to be configurable. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer. In one example, the node computing device 110 can be implemented as a circuit board, e.g., NVIDIA Xavier™ (sold by NVIDIA Corp. of Santa Clara, Calif., USA) or the like.

The node communications interface 112 can include one or more mechanisms, including any desired combination of wireless (e.g., cellular, wireless, satellite, microwave and radio frequency) communication transceivers and other mechanisms to support various network topologies. Exemplary communications provided via the communications interface 112 could include cellular, Bluetooth, IEEE 802.11, and/or Dedicated Short Range Communications (DSRC).

A wide area network 118 is a digital network wherein data is sent and received in packets, and includes one or more mechanisms by which geographically dispersed computing devices can communicate, i.e., the wide area network 118 is useful where devices cannot communicate using short-range technologies such as Wi-Fi, Bluetooth, etc. The wide area network 118 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized).

A vehicle 124 in the context of the system 100 may be any suitable type of automobile, e.g., a passenger or commercial automobile such as a sedan, a coupe, a truck, a sport utility vehicle 124, a crossover vehicle 124, a van, a minivan, a taxi, a bus, etc. The vehicle 124, for example, may be an autonomous vehicle 124. In other words, the vehicle 124 may be autonomously operated such that the vehicle 124 may be driven without constant attention from a driver, i.e., the vehicle 124 may be partly or entirely self-driving without human input. Further, vehicles 124 could include computers and communications interfaces similar to the above-described to communicate, e.g., via DSRC, Wi-Fi, or other suitable mechanisms, with edge devices 106 and/or other vehicles 124.

Cluster Deployment

Figure 3A:
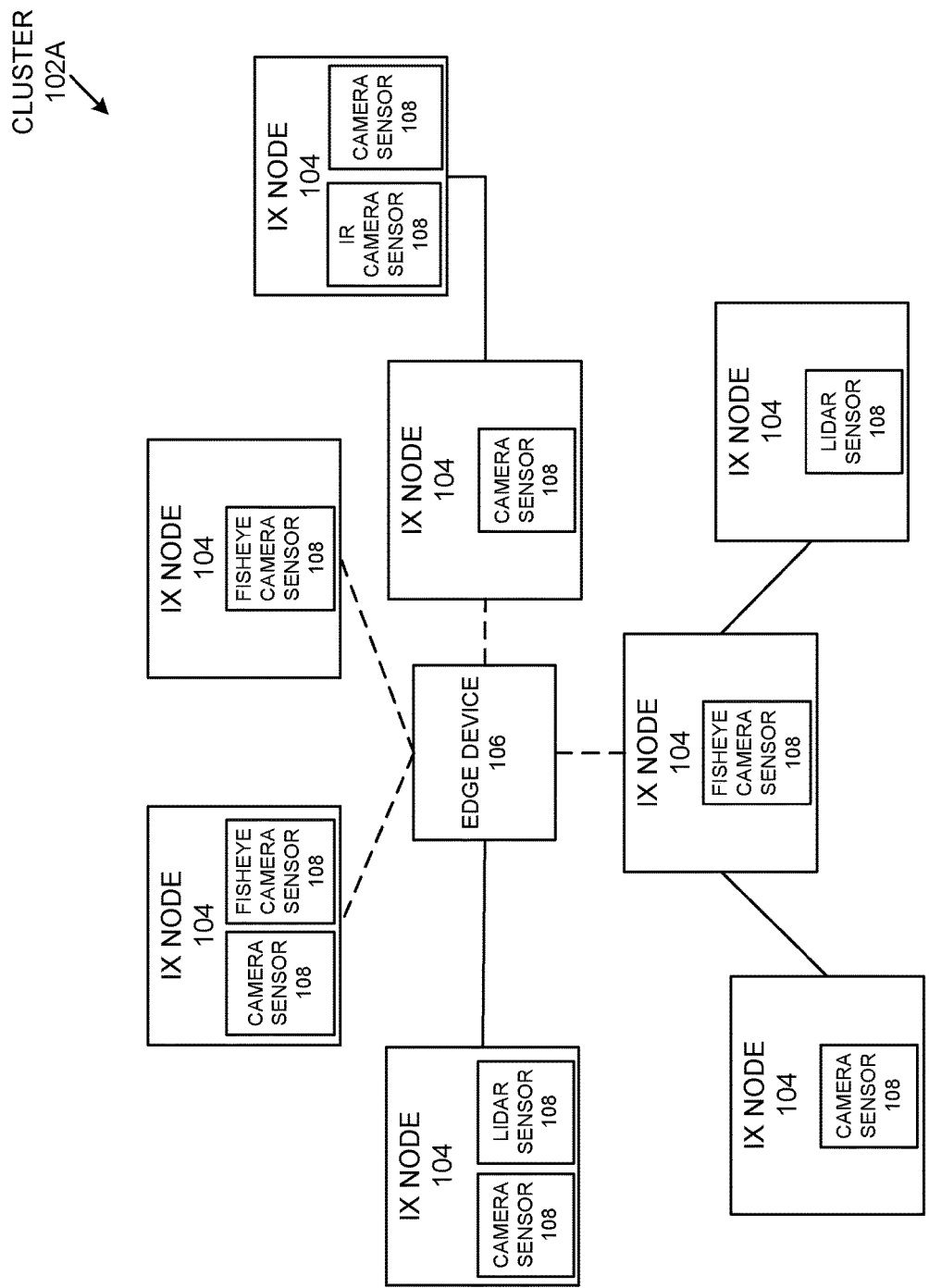
FIG. 3A is a block diagram of an example of a roadside infrastructure node cluster topology.
Figure 3B:
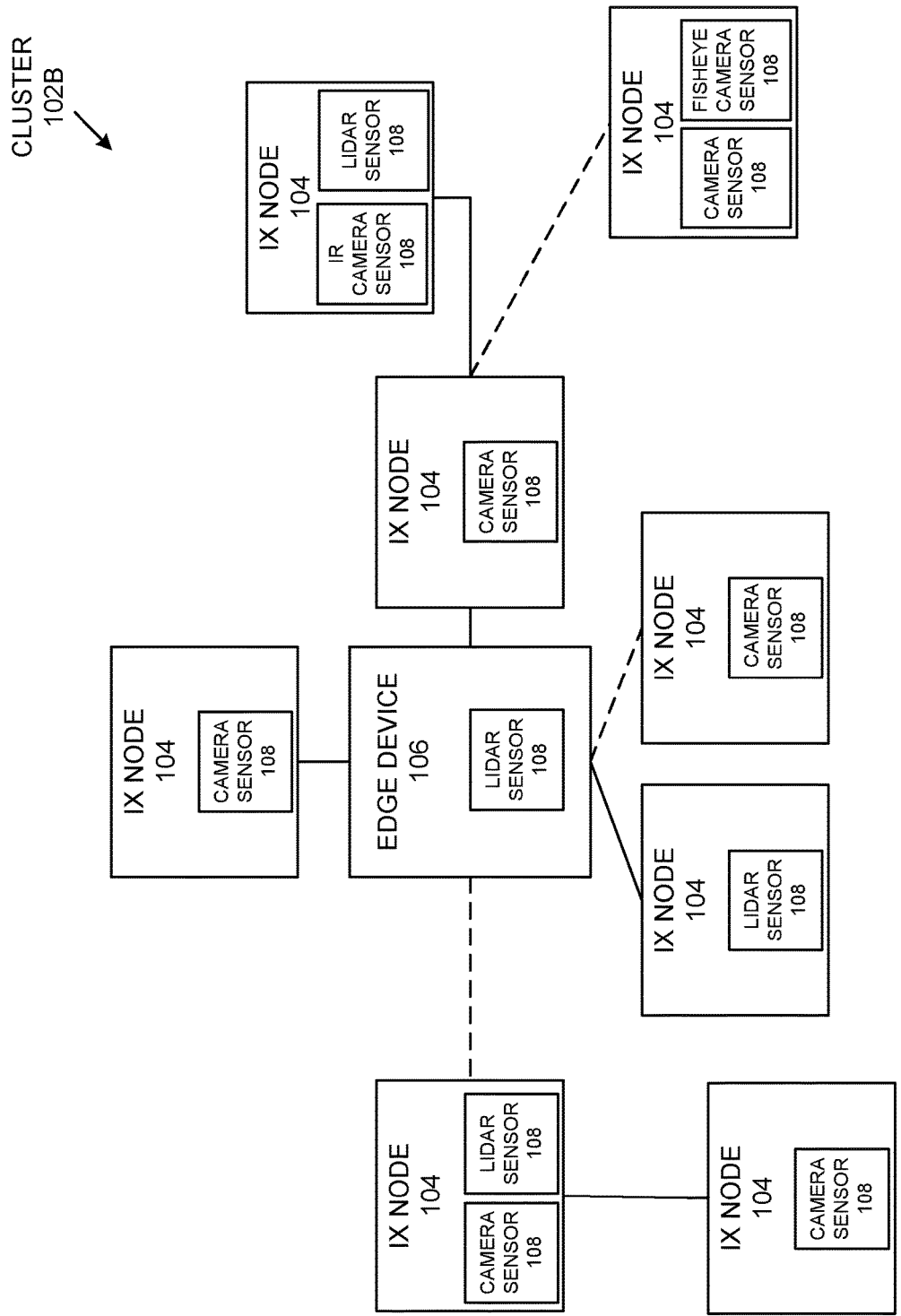
FIG. 3B is a block diagram of another example of a roadside infrastructure node cluster topology.

FIGS. 3A and 3B are block diagrams illustrating example node clusters 102A and 102B, respectively, including various parameters that could be varied in different cluster topologies, such as whether communications links are wired or wireless, and types and numbers of sensors and respective nodes 104. It will be appreciated that the clusters 102A and 102B illustrate the possibility of a wide variety of cluster topologies. Further, as discussed below, determining a cluster topology can take into account a variety of parameters, only some of which are illustrated in FIGS. 3A and 3B; i.e., for ease of illustration some parameters are not illustrated in FIGS. 3A and 3B. For example, in the context of the present disclosure, a cluster topology includes mounting locations 405 (see FIG. 4) for each node 104, 106, and can specify a pose of a node 104, 106, or a sensor 108 included thereon.

The clusters 102A, 102B include, for purposes of illustration, eight infrastructure nodes 104 and an edge device node 106, although a cluster 102 could of course include more or fewer nodes 104, and could include more than one edge node 106. The solid lines connecting the nodes 104, 106 represent wired connections, e.g., ethernet. The dashed lines represent wireless connections, e.g., Wi-Fi. Infrastructure nodes 104 are shown as including one or two sensors 108 for illustrative purposes, but a node 104 could include three or more sensors 108, or zero sensors 108, i.e., could be provided simply as a repeater node 104. Likewise, an edge node 106 may not include any sensors 108 (FIG. 3A) or could include one or more sensors 108 (FIG. 3B). FIGS. 3A and 3B reference certain types of conventional sensors, i.e., a camera sensor 108 that could be a video camera providing conventional two-dimensional images by detecting the visible light spectrum, an infrared camera sensor 108 providing images by detecting the infrared spectrum, a fisheye camera sensor 108 that may detect the visible light spectrum in an expanded, e.g., up to 180 degree, field of view, and a lidar (light detection and ranging) sensor 108. Further, again it should be noted that FIGS. 3A and 3B are illustrative and not limiting; for example, it is to be understood that other types of sensors 108 are possible for inclusion in nodes 104, 106, e.g., radar, ultrasonic sensors, etc.

Figure 4:
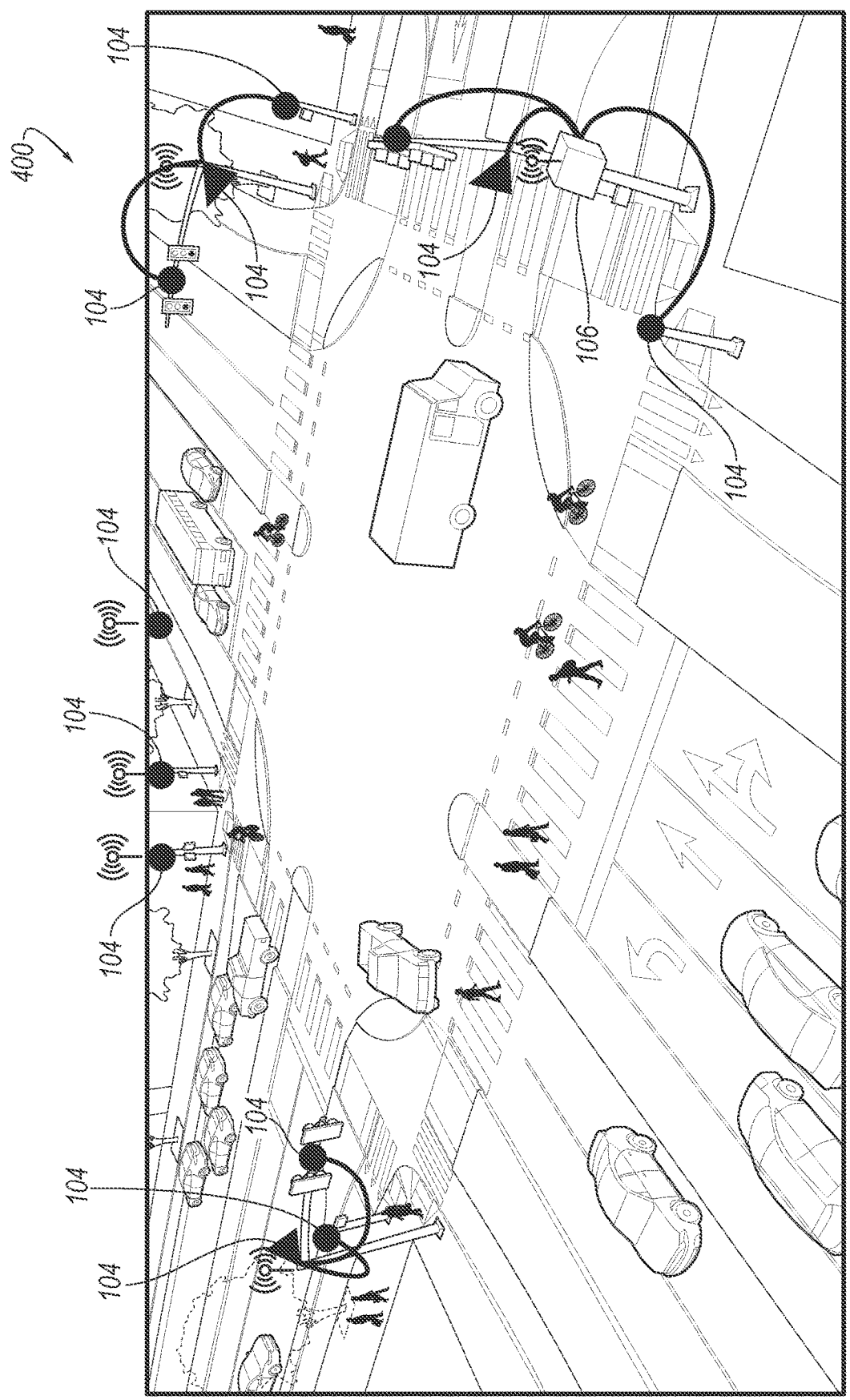
FIG. 4 illustrates an area for deployment of a node cluster.

FIG. 4 illustrates an area 400 for deployment of a node cluster 102. As can be seen, the area 400 includes an intersection of two roads, each bi-directional, and multi-lane. The area 400 may be occupied by one or more vehicles 124, and other mobile objects such as pedestrians and cyclists. Further, the area 400 includes a plurality of potential mounting locations 405 for infrastructure nodes 104 and/or an edge device 106. Mounting locations 405 could include poles, fixtures provided for stop lights or streetlamps, and/or other locations not illustrated, such as trees, buildings, overpasses, etc. Nodes 104 can be provided in the area 400 to detect objects 410, such as vehicles, pedestrians, etc.

As explained further below, a genetic search algorithm that includes a fitness function can be used to determine a cluster 102 topology, i.e., mounting locations 405 of nodes 104 and an edge device 106, and configurations of nodes 104 and the edge device at mounting locations 405 selected for a node 104 and/or edge device 106. The genetic search algorithm evaluates fitnesses of respective individual candidate topologies $A_1 \ldots A_n$, in a set n candidate cluster topologies, where for each individual candidate $A_x$ in the set, a set of install parameters $a_k$ is specified for each available mounting location 405. That is, for each value x from 1 to n, i.e., for each individual candidate cluster configuration in a set, each $A_x = \{a_1, a_2, \ldots a_m\}$, where m is a number of available mounting locations 405 in an area 405 where the node cluster 102 is to be deployed, and each data set $a_1$, $a_2, \ldots a_m$ includes, for respective mounting locations 1 through m, a specification of install parameters as explained further below. As further explained below, selecting a cluster topology $A_x$ for deployment in an area 400 includes evaluating install parameters for cluster topologies in respective simulations that can include, in addition to taking into account install parameters, various sensor parameters and/or environmental parameters of many possible cluster topologies.

Install parameters for an available node mounting location 405 are values specifying provided infrastructure elements and/or constraints at the location 405. Example install parameters are listed in Table 1 below.

TABLE 1

| Install parameter | Definition | Example value(s) |
|---|---|---|
| Location | Geographic location of the mounting location 405. | Coordinates in a global or local (e.g., for an area 400) coordinate system. |
| Power source | Type(s) of available electrical power. | 110AC, battery-only |
| Communications mode(s) | Types of communications media and/or protocols | Wi-Fi, Bluetooth, co-axial cable, Ethernet, fiber-optic cable |
| Sensor pose | Permissible position or ranges of positions of sensors at the location in six degrees of freedom | Specified angle or ranges of angles with respect to X, Y, and Z axes of a 3D coordinate system, e.g., for an area 400. |

Example sensor parameters are shown in Table 2 below.

TABLE 2

| Sensor parameter | Definition | Example value(s) |
|---|---|---|
| Sensor type | Type of sensor; each different sensor type provides data sensed in a different manner | Video camera, fisheye video camera, lidar, radar. |
| Sensor power requirement(s) | Type(s) of electrical power required for the sensor type to operate. | 110AC, battery-only |
| Sensor field of view | Specification of a field of view of the sensor type. | Ninety degrees (e.g., for a video camera), one-hundred-eighty degrees (e.g., for a fisheye camera), three-hundred sixty degrees (e.g., for radar or lidar). |
| Sensor range | Distance at which the sensor can provide data to accurately detect objects. | 10 meters, 25 meters, 50 meters. |

Example environment parameters are shown in Table 3 below.

TABLE 3

| Env. parameter | Definition | Example value(s) |
|---|---|---|
| Latency (wired) | Latency via wired communications, i.e., time for a packet to travel from one node to another. | 10 milliseconds |
| Latency (wireless) | Latency via wireless communications, i.e., time for a packet to travel from one node to another. | 25 milliseconds |
| Drop rate (node-to node) | Drop rate of packets sent between nodes 104 and/or edge device 106 | 4% |
| Drop rate (V2X) | Drop rate of packets sent from nodes 104 or edge vehicles 124. | 7% device 106 and |
| Ground truth object(s) | Set of one or more three-dimensional objects specified as ground truth for a scenario; objects can be stationary (e.g., trees, buildings, poles, bridges) or mobile (e.g., vehicles 124, cycles, pedestrians), | Data can include object type (stationary or mobile, connected or non-connected vehicle, pedestrian, etc.) object dimensions (e.g., a specified bounding box for the object), object location at a starting time of a simulation, planned object trajectory, i.e., velocity, heading, and/or heading change(s) (if mobile). |
| Ambient light | Amount of ambient light in an area 400 | Can be specified in lumens |
| Ambient temperature | Temperature in an area 400 | Can be specified in degrees centigrade or degrees Fahrenheit. |
| Date and/or time of day | | |
| Precipitation | Presence of fog, rain, snow, sleet, etc. | |

Thus, various sensor parameters and environmental parameters could be specified for a simulation. Then simulations can be run for respective candidate topologies $A_x$. Input to a simulation includes install parameters for the node configuration $A_x$ or which the simulation is being run, along with sensor parameters and environmental parameters specified for the simulation. One aspect of providing input to a simulation includes specifying ground truth objects to reflect likely real-world activity and features of an environment in an area 400. For example, a node cluster 102 may be provided to monitor a road intersection, wherein it is typically desirable to represent the intersection with ground truth objects that reflect likely real-world conditions, e.g., stationary objects such as trees or buildings that could include sensor views, a presence of a realistic number of mobile objects such as vehicles or pedestrians, etc. further, it can be important to model environmental parameters that may be present and that could introduce noise into measurements of ground truth objects, such as precipitation, presence or absence of ambient light, etc.

Figure 5:
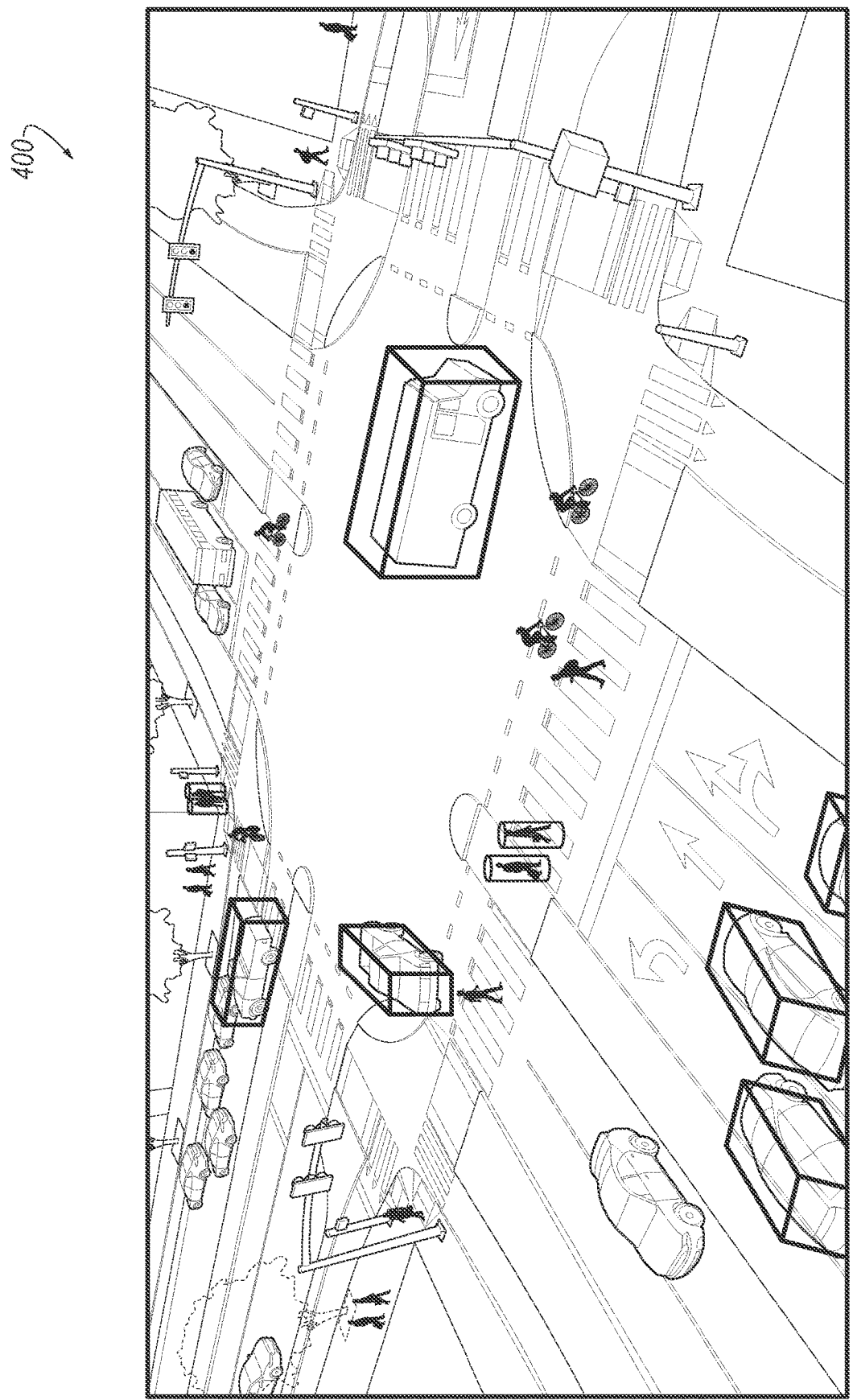
FIG. 5 shows an area for deployment of a node cluster with objects specified by bounding boxes representing ground truth data.
Figure 6:
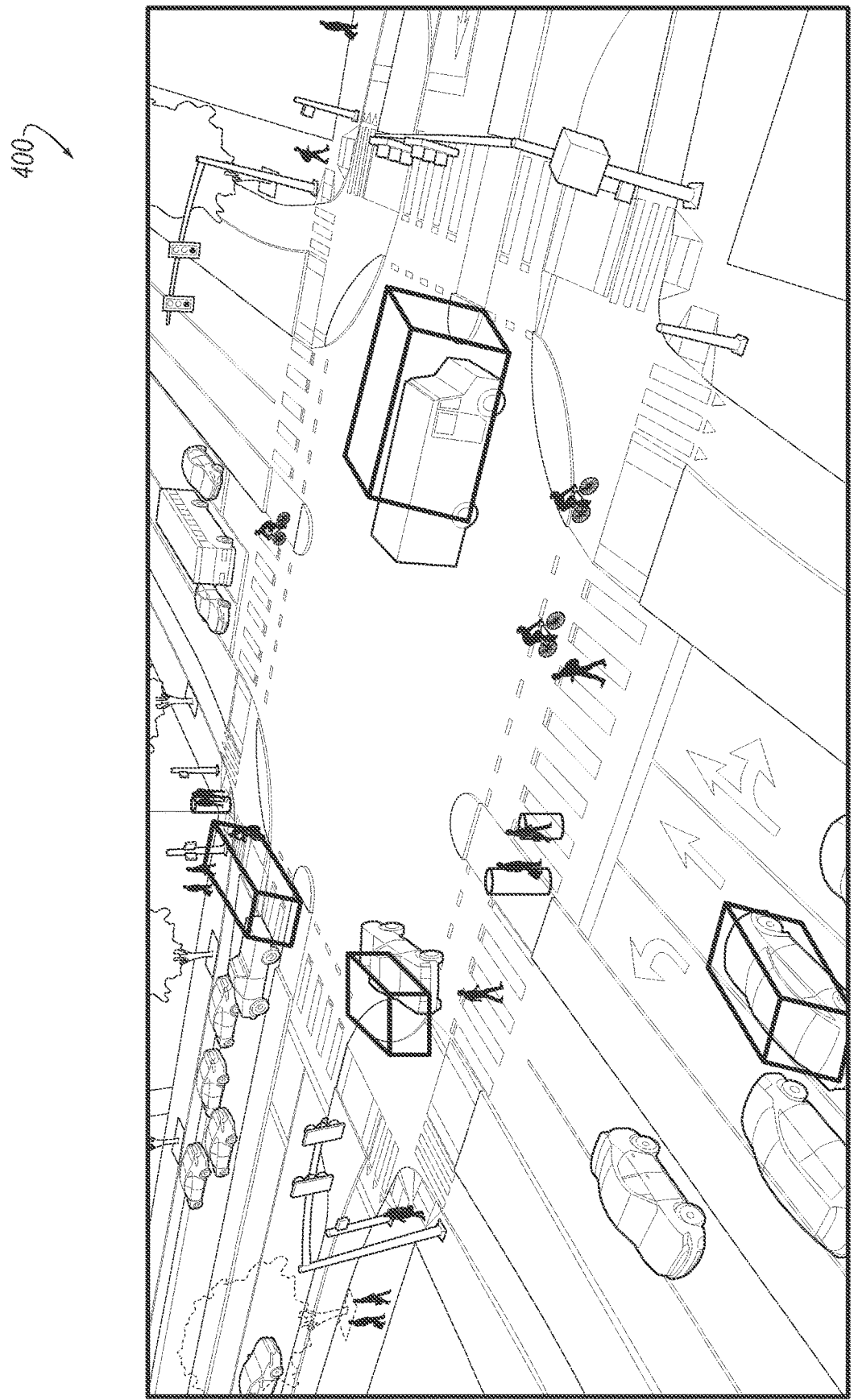
FIG. 6 shows an area for deployment of a node cluster with objects specified by bounding boxes that represent detection of the objects in a simulation.

Once a simulation is run, output simulation is then a list of objects detected during the simulation. For each object, data output from the simulation can include a location, dimensions, pose, and/or orientation for the object at one or more times (i.e., timestamps) in the simulation. Then, objects in a set of ground truth objects that can be included in environmental parameters as described above can be compared to objects detected in simulation output. For example, FIG. 5 shows an area 400 with objects 410 specified by bounding boxes 415 representing ground truth data. FIG. 6 shows the area 400 with objects 410 specified by bounding boxes 415 that represent detection of the objects 410 in a simulation. By comparing ground truth bounding boxes 415 to simulated detected bounding boxes 415, a fitness value can be determined. For example, a bounding box can be defined for a ground truth object and compared to a bounding box in a detected object included in simulation output using an Intersection over Union technique, which as is known can be used to evaluate the similarity of detected data, e.g., an object, to ground truth data, e.g., ground truth data about an object.

Once simulation outputs have been obtained for a simulation run with respect to a candidate topology $A_x$ then a fitness function can be applied to evaluate a fitness of the cluster node configuration for a cluster 102 in an area 400. An example fitness function is:

$$\text{fitness}(A_x) = \text{IOU}(\text{objs}_{gt}, \text{objs}_{sim}) + \text{penalty}_{missed} \quad (1),$$

where $\text{IOU}(\text{objs}_{gt}, \text{objs}_{sim})$ is a measure of evaluating the intersection over union (IOU) of objects detected in a simulation, compared to ground truth objects. For example, $\text{IOU}(\text{objs}_{gt}, \text{objs}_{sim})$ could represent an average of the intersection over union for each detected object compared to ground truth data. further, $\text{penalty}_{missed}$ could represent a penalty assessed for each object present in ground truth data environmental parameters for the simulation that was not detected when the simulation was run for a given candidate topology $A_x$. An IOU value typically lies between zero and one (inclusive), where zero means that a ground truth bounding box for an object has not overlap or intersection with a detected object bounding box, and one means that a detected bounding box for an object exactly matches a detected object bounding box. An ideal or best IOU value thus would be a value of one, although in an example implementation any value of 0.5 or greater is regarded as a good value, i.e., an IOU value likely indicating an acceptable detection of an object.

Other factors then shown in Expression (1) above could be included in the fitness function and/or applied after evaluating the fitness function. For example, economic costs of sensors 108 and/or installation of nodes 104, 106 for a given candidate cluster node configuration could be included. Further, as mentioned below, evaluating the fitness function could return multiple topologies satisfying a threshold fitness function; factors not included in a fitness function such as economic cost could then be used to further narrow a pool or set of candidate topologies.

Example Process Flow

Figure 7:
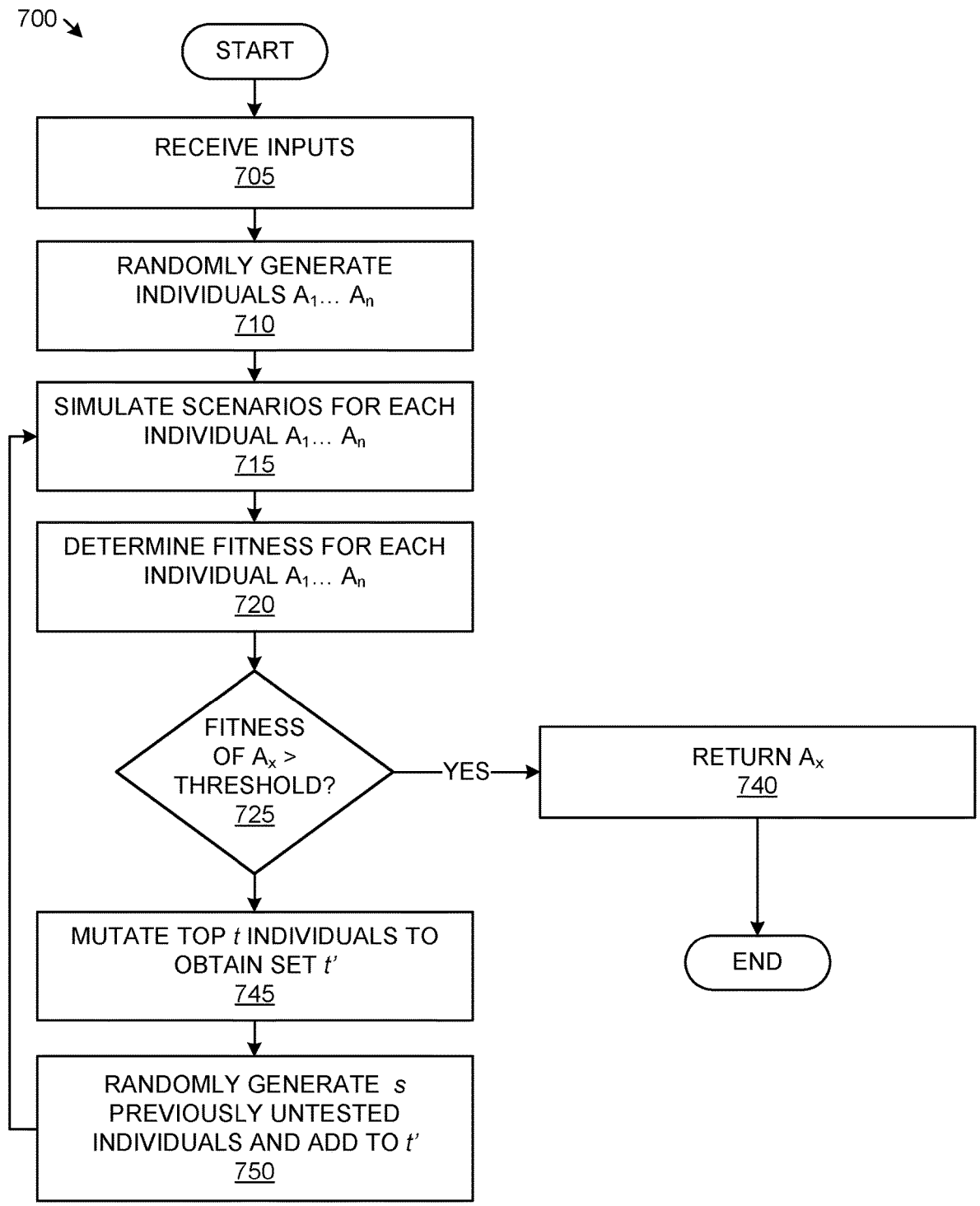
FIG. 7 illustrates an example process for determining an infrastructure node topology.

FIG. 7 illustrates an example process 700 for determining a cluster configuration including an infrastructure node topology. The process 700 can be carried out by a general purpose computer that includes a processor and a memory, the memory storing program instructions executable by the processor for carrying out blocks of the process 700; alternatively, the process 700 could be performed in a clustered computing environment, i.e., by a plurality of computers clustered together.

The process 700 begins in a block 705, in which the computer receives inputs for determining a node cluster 102 topology and/or cluster 102 configuration. These inputs can include install parameters specifying mounting locations 405 for nodes 104 in an area 400 for determining possible topologies, such as described above. Further, the computer can receive inputs for simulation scenarios, i.e., sensor parameters and environment parameters that can be included along with a cluster 102 topology in a node configuration to be input to a simulation.

Next, in a block 710, the computer can randomly generate a set t of a number n of individual candidate topologies, e.g., a set $A_1 \ldots A_n$, such as described above.

Next, in a block 715, the computer executes simulations, using any suitable simulation tool(s), for each respective individual candidate topology $A_x$ in the set t (or subsequent sets t', described below) generated in the block 710, typically according to the install parameters, sensor parameters, and environment parameters input in the block 705. In other words, the computer can simulate a cluster configuration including the individual candidate topology $A_x$.

Next, in a block 720, the computer compares locations and/or dimensions of detected objects according to the respective simulations to ground truth data specifying locations and/or dimensions of objects in the area 400 to obtain a fitness score, as described above, e.g., evaluates the fitness function provided above in Expression (1), for each of the individual candidate topologies in the set generated in the block 710.

Next, in a block 725, the computer determines whether a fitness score of one or more of the individual candidate topologies in the set generated in a block 710 exceeds a threshold. The threshold can be determined to select a candidate topology that detects objects in an area 400 with a sufficient degree of reliability, e.g., objects are detected within a specified distance of locations and/or positions specified by ground truth data, e.g., 1 cm or 2 cm, etc., while minimizing a number of missed objects. For example, as explained above, the fitness function could be a combination of an IOU function and a penalty for missed objects, wherein the fitness function could return a value of between zero and one, inclusive, and a value of 0.5 or higher might satisfy a threshold. Alternatively or additionally, a top n topologies could be selected and a threshold dispensed with altogether, and/or a top n topologies over the threshold could be selected. Further, as noted above, a fitness function could include other factors, such as economic cost, and the threshold could be selected to take into account such factors. As noted above, a selected topology can be included along with sensor parameters and environmental parameters to determine a cluster configuration. If so, a block 740 is executed next. Otherwise, a block 745 is executed next.

In the block 740, the computer returns or outputs the candidate topology or topologies identified in the block 725 as exceeding the threshold fitness score, in the process 700 then ends.

In the block 745, the computer mutates a selected subset of the individual candidate topologies in the set generated in a block 710 to obtain a second set t' of individual candidate topologies. FIGS. 3A and 3B provide examples of parameters that could be varied in a mutation, e.g., specifications $a_x$ for a node 104 at a mounting location 405. For example, types of communication connection (e.g., wired or wireless), types of sensor 108 (e.g., lidar, camera, fisheye camera, infrared camera), etc. could be varied. Other parameters including without limitation sensor parameters and install parameters such as discussed above could be varied, e.g., within ranges or values specified in the block 705.

Typically, the mutation is performed randomly. The number of individual candidate topologies in the selected subset is typically less than all, e.g., one quarter, half, etc., of the individual candidate topologies generated in the block 710. However, it is to be understood that the computer could mutate all of the individual candidate topologies in the set generated in the block 710 and/or the block 750, discussed next, could be omitted, at least in some iterations of the process 700.

Next, in a block 750, the computer randomly generates a set s of individual candidate topologies, such as described above, typically such that a number of individual candidate topologies in the set and the set adds up to n. Following the block 750, the process 700 returns to the block 715.

Conclusion and Additional Information

A system comprises a computer including a processor and a memory, the memory storing instructions executable by the processor to: randomly generate a set of first candidate topologies of first candidate roadside infrastructure nodes at respective mounting locations in a geographic area; for each of the first candidate topologies, execute first simulations including detection of objects according to selected sensor parameters, installation parameters, and environment parameters for the candidate nodes at the respective mounting locations; determine first fitness scores for each of the first candidate topologies by comparing results of the first simulations to ground truth data; and upon identifying one of the first fitness scores as exceeding a threshold, identify the candidate topology associated with the identified first fitness score for deployment.

The instructions can further include instructions to: upon determining that none of the first fitness scores exceed the threshold, select some but not all of the first candidate topologies according to the first fitness scores; generate a set of second candidate topologies at least in part by randomly mutating the installation parameters for the candidate roadside infrastructure nodes in each of the selected first individual topologies; for each of the second candidate topologies, execute second simulations including detection of objects according to the selected sensor parameters, installation parameters, and environment parameters for the candidate nodes at the respective mounting locations; determine second fitness scores for each of the second candidate topologies by comparing results of the second simulations to ground truth data; and upon identifying one of the second fitness scores as exceeding a threshold, identify the candidate topology associated with the identified second fitness score for deployment.

The instructions can further include instructions to: upon determining that none of the second fitness scores exceed the threshold, select some but not all of the second candidate topologies according to the second fitness scores; generate a set of third candidate topologies at least in part by randomly mutating the installation parameters for the candidate roadside infrastructure nodes in each of the selected second individual topologies; for each of the third candidate topologies, execute third simulations including detection of objects according to the selected sensor parameters, installation parameters, and environment parameters for the candidate nodes at the respective mounting locations; determine second fitness scores for each of the third candidate topologies by comparing results of the third simulations to ground truth data; and upon identifying one of the third fitness scores as exceeding a threshold, identify the candidate topology associated with the identified third fitness score for deployment.

The instructions can further include instructions to generate the set of second candidate topologies further at least in part by randomly generating the set of second candidate topologies.

The environment parameters can include respective locations of one or more objects. The environment parameters can include respective dimensions of one or more objects. The environment parameters can include one or more of a time of day, an ambient temperature, and amount of ambient light, and a sensor noise factor. The environment parameters can include one or more of noise, latency, or packet drop ratio.

The selected sensor parameters can include at least one of a sensor type, a sensor power requirement, a sensor field of view, and a sensor range.

The installation parameters can specify whether communication is wired or wireless. The installation parameters can specify an edge node status that indicates that a roadside infrastructure node is one of an edge node or not an edge node.

The instructions can further include instructions to determine the first fitness scores according to a fitness function.

A method, comprises randomly generating a set of first candidate topologies of first candidate roadside infrastructure nodes at respective mounting locations in a geographic area; for each of the first candidate topologies, executing first simulations including detection of objects according to selected sensor parameters, installation parameters, and environment parameters for the candidate nodes at the respective mounting locations; determining first fitness scores for each of the first candidate topologies by comparing results of the first simulations to ground truth data; and upon identifying one of the first fitness scores as exceeding a threshold, identifying the candidate topology associated with the identified first fitness score for deployment.

The method can further comprise: upon determining that none of the first fitness scores exceed the threshold, selecting some but not all of the first candidate topologies according to the first fitness scores; generating a set of second candidate topologies at least in part by randomly mutating the installation parameters for the candidate roadside infrastructure nodes in each of the selected first individual topologies; for each of the second candidate topologies, executing second simulations including detection of objects according to the selected sensor parameters, installation parameters, and environment parameters for the candidate nodes at the respective mounting locations; determining second fitness scores for each of the second candidate topologies by comparing results of the second simulations to ground truth data; and upon identifying one of the second fitness scores as exceeding a threshold, identifying the candidate topology associated with the identified second fitness score for deployment.

The method can further comprise: upon determining that none of the second fitness scores exceed the threshold, selecting some but not all of the second candidate topologies according to the second fitness scores; generating a set of third candidate topologies at least in part by randomly mutating the installation parameters for the candidate roadside infrastructure nodes in each of the selected second individual topologies; for each of the third candidate topologies, executing third simulations including detection of objects according to the selected sensor parameters, installation parameters, and environment parameters for the candidate nodes at the respective mounting locations; determining second fitness scores for each of the third candidate topologies by comparing results of the third simulations to ground truth data; and upon identifying one of the third fitness scores as exceeding a threshold, identifying the candidate topology associated with the identified third fitness score for deployment.

The method can further comprise generating the set of second candidate topologies further at least in part by randomly generating the set of second candidate topologies.

The method can further comprise that the environment parameters include one or more of: (a) respective locations of one or more objects, (b) respective dimensions of one or more objects, (c) one or more of a time of day, an ambient temperature, and amount of ambient light, and a sensor noise factor, or (d) one or more of noise, latency, or packet drop ratio.

The method can further comprise that the selected sensor parameters include at least one of a sensor type, a sensor power requirement, a sensor field of view, and a sensor range.

The method can further comprise that the installation parameters specify one or more of (a) whether communication is wired or wireless, or (b) an edge node status that indicates that a roadside infrastructure node is one of an edge node or not an edge node.

The method can further comprise that the instructions further include instructions to determine the first fitness scores according to a fitness function.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., and the Android operating system developed by Google, Inc. and the Open Handset Alliance, or the QNX® CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer readable medium (also referred to as a processor readable medium) that includes any non transitory (e.g., tangible) medium that participates in providing data (e.g., instructions) that may be read by a computer (e.g., by a processor of a computer). Such a medium may take many forms, including, but not limited to, non volatile media and volatile media. Non volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, a RAM, a PROM, an EPROM, a FLASH EEPROM, any other memory chip or cartridge, or any other physical medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   randomly generate a set of first candidate topologies of first candidate roadside infrastructure nodes at respective mounting locations in a geographic area;
   for each of the first candidate topologies, execute first simulations including detection of objects according to selected sensor parameters, installation parameters, and environment parameters for the candidate nodes at the respective mounting locations;
   determine first fitness scores for each of the first candidate topologies by comparing results of the first simulations to ground truth data;
   upon identifying one of the first fitness scores as exceeding a threshold, identify the candidate topology associated with the identified first fitness score for deployment;
   upon determining that none of the first fitness scores exceed the threshold, select some but not all of the first candidate topologies according to the first fitness scores;
   generate a set of second candidate topologies at least in part by randomly mutating the installation parameters for the candidate roadside infrastructure nodes in each of the selected first individual topologies;
   for each of the second candidate topologies, execute second simulations including detection of objects according to the selected sensor parameters, installation parameters, and environment parameters for the candidate nodes at the respective mounting locations;
   determine second fitness scores for each of the second candidate topologies by comparing results of the second simulations to ground truth data; and
   upon identifying one of the second fitness scores as exceeding a threshold, identify the candidate topology associated with the identified second fitness score for deployment.

2. The system of claim 1, wherein the instructions further include instructions to:
   upon determining that none of the second fitness scores exceed the threshold, select some but not all of the second candidate topologies according to the second fitness scores;
   generate a set of third candidate topologies at least in part by randomly mutating the installation parameters for the candidate roadside infrastructure nodes in each of the selected second individual topologies;
   for each of the third candidate topologies, execute third simulations including detection of objects according to the selected sensor parameters, installation parameters, and environment parameters for the candidate nodes at the respective mounting locations;
   determine second fitness scores for each of the third candidate topologies by comparing results of the third simulations to ground truth data; and
   upon identifying one of the third fitness scores as exceeding a threshold, identify the candidate topology associated with the identified third fitness score for deployment.

3. The system of claim 1, wherein the instructions further include instructions to generate the set of second candidate topologies further at least in part by randomly generating the set of second candidate topologies.

4. The system of claim 1, wherein the environment parameters include respective locations of one or more objects.

5. The system of claim 1, wherein the environment parameters include respective dimensions of one or more objects.

6. The system of claim 1, wherein the environment parameters include one or more of a time of day, an ambient temperature, an amount of ambient light, and a sensor noise factor.

7. The system of claim 1, wherein the environment parameters include one or more of noise, latency, or packet drop ratio.

8. The system of claim 1, wherein the selected sensor parameters include at least one of a sensor type, a sensor power requirement, a sensor field of view, and a sensor range.

9. The system of claim 1, wherein the installation parameters specify whether communication is wired or wireless.

10. The system of claim 1, wherein the installation parameters include an edge node status that indicates that a roadside infrastructure node is one of an edge node or not an edge node.

11. The system of claim 1, wherein the instructions further include instructions to determine the first fitness scores according to a fitness function.

12. A method, comprising:
   randomly generating a set of first candidate topologies of first candidate roadside infrastructure nodes at respective mounting locations in a geographic area;
   for each of the first candidate topologies, executing first simulations including detection of objects according to selected sensor parameters, installation parameters, and environment parameters for the candidate nodes at the respective mounting locations;
   determining first fitness scores for each of the first candidate topologies by comparing results of the first simulations to ground truth data;
   upon identifying one of the first fitness scores as exceeding a threshold, identifying the candidate topology associated with the identified first fitness score for deployment;
   upon determining that none of the first fitness scores exceed the threshold, selecting some but not all of the first candidate topologies according to the first fitness scores;
   generating a set of second candidate topologies at least in part by randomly mutating the installation parameters for the candidate roadside infrastructure nodes in each of the selected first individual topologies;
   for each of the second candidate topologies, executing second simulations including detection of objects according to the selected sensor parameters, installation parameters, and environment parameters for the candidate nodes at the respective mounting locations;
   determining second fitness scores for each of the second candidate topologies by comparing results of the second simulations to ground truth data; and upon identifying one of the second fitness scores as exceeding a threshold, identifying the candidate topology associated with the identified second fitness score for deployment.

13. The method of claim 12, further comprising:

upon determining that none of the second fitness scores exceed the threshold, selecting some but not all of the second candidate topologies according to the second fitness scores;

generating a set of third candidate topologies at least in part by randomly mutating the installation parameters for the candidate roadside infrastructure nodes in each of the selected second individual topologies;

for each of the third candidate topologies, executing third simulations including detection of objects according to the selected sensor parameters, installation parameters, and environment parameters for the candidate nodes at the respective mounting locations;

determining second fitness scores for each of the third candidate topologies by comparing results of the third simulations to ground truth data; and upon identifying one of the third fitness scores as exceeding a threshold, identifying the candidate topology associated with the identified third fitness score for deployment.

14. The method of claim 12, further comprising generating the set of second candidate topologies further at least in part by randomly generating the set of second candidate topologies.

15. The method of claim 12, wherein the environment parameters include one or more of: (a) respective locations of one or more objects, (b) respective dimensions of one or more objects, (c) one or more of a time of day, an ambient temperature, an amount of ambient light, and a sensor noise factor, or (d) one or more of noise, latency, or packet drop ratio.

16. The method of claim 12, wherein the selected sensor parameters include at least one of a sensor type, a sensor power requirement, a sensor field of view, and a sensor range.

17. The method of claim 12, wherein the installation parameters specify one or more of (a) whether communication is wired or wireless, or (b) an edge node status that indicates that a roadside infrastructure node is one of an edge node or not an edge node.

18. The method of claim 12, wherein the instructions further include instructions to determine the first fitness scores according to a fitness function.

* * * * *